Figure 3:
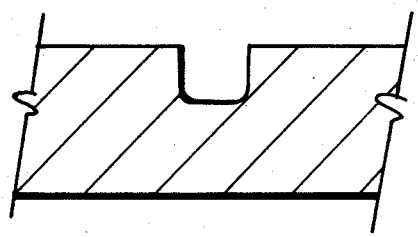

United States Patent [19]

East

[11] Patent Number: 4,726,455
[45] Date of Patent: Feb. 23, 1988

[54] CLUTCH FACINGS

[75] Inventor: Roy G. East, Buxton, United Kingdom

[73] Assignee: Ferodo Limited, Manchester, England

[21] Appl. No.: 814,373

[22] Filed: Dec. 30, 1985

[30] Foreign Application Priority Data

Jan. 11, 1985 [GB] United Kingdom ............... 8500743

[51] Int. Cl.$^4$ ....................... F16D 69/00; F16D 13/64
[52] U.S. Cl. ............................ 192/107 R; 192/70.14
[58] Field of Search .......... 192/107 R, 113 R, 113 B, 192/113 A, 70.12, 70.14; 188/71.6, 264 A, 264 AA, 218 Xl

[56] References Cited

U.S. PATENT DOCUMENTS

| | | | |
|---|---|---|---|
| 1,936,240 | 11/1933 | Lane | 192/107 R |
| 2,097,710 | 11/1937 | Whitelaw et al. | 192/107 R |
| 2,430,936 | 11/1947 | Kraft | 188/218 XL |
| 2,516,544 | 7/1950 | Breeze | 192/113 B |
| 2,690,248 | 9/1954 | McDowall | 192/107 R X |
| 2,850,118 | 9/1958 | Byers | 188/218 XL X |
| 2,987,143 | 6/1961 | Culbertson et al. | 188/264 A X |
| 3,081,842 | 3/1963 | Zindler et al. | 188/218 XL X |
| 3,425,524 | 2/1969 | Dewar | 188/218 XL |
| 4,027,758 | 6/1977 | Gustavsson et al. | 192/113 B |
| 4,396,100 | 8/1983 | Eltze | 192/107 R X |

FOREIGN PATENT DOCUMENTS 1498813 1/1978 United Kingdom .
1604827 12/1981 United Kingdom .
2125125 2/1984 United Kingdom .

Primary Examiner—Rodney H. Bonck
Attorney, Agent, or Firm—Nixon & Vanderhye

[57] ABSTRACT

A moulded annular clutch facing has a plurality of surface grooves moulded into the facing. Each groove extends not substantially more than half way across the annulus, is not greater than 40% of the thickness of the facing in depth and extends either from the bore or the outer perimeter of the annulus.

9 Claims, 4 Drawing Figures

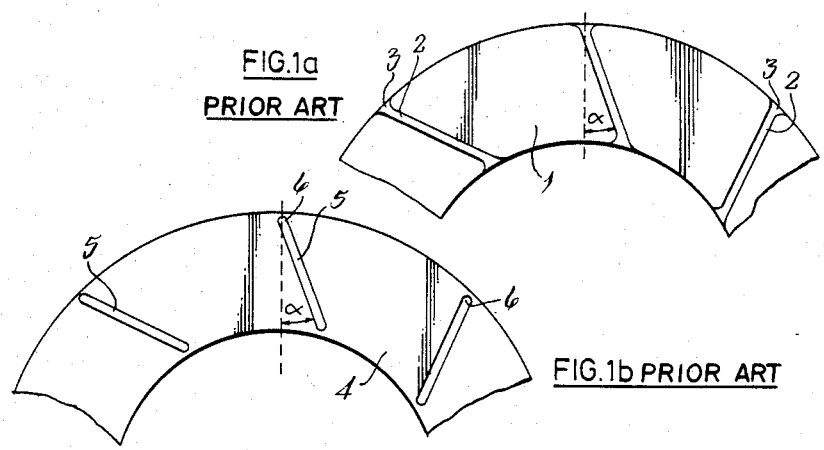
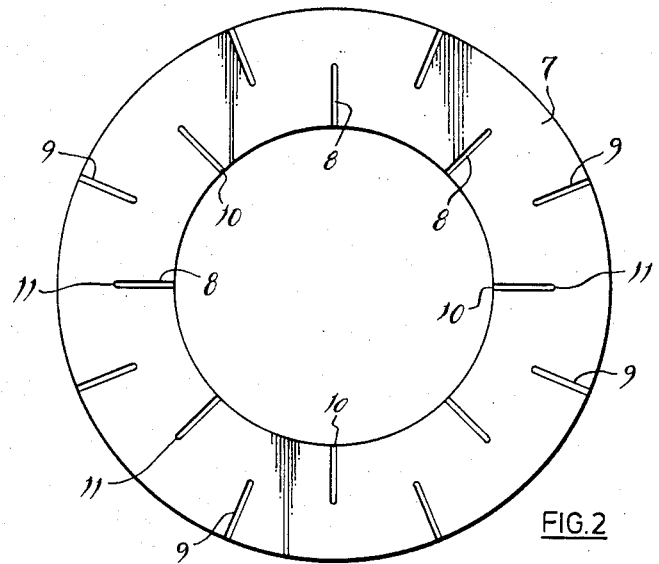

CLUTCH FACINGS

This invention relates to clutch facings, and in particular to clutch facings having surface grooves.

Clutch facings conventionally take the form of an annulus of friction lining material which is to be attached to a clutch plate. It is known to provide grooves extending across the width of the annulus, either radially or in a direction disposed at an acute angle with the radial direction.

A number of benefits are claimed for grooving, these including
(i) significantly improved torque capacity and hill start capability,
(ii) reduced propensity for judder
(iii) improved take-up characteristics
(iv) improved resistance to 'ringing on' ('Ringing on' is the phenomenon which involves the facing adhering to its mating surface on standing which prevents the clutch from being disengaged).

There are, however, disadvantages arising from grooving. In the case of moulded clutch facings these are increased cost of manufacture, if the grooves are machined into the facing, or reduced burst strength if the grooves are moulded into the facing.

The present invention is particularly but not exclusively, applicable to the provision of grooves in a thin, lightweight moulded clutch facing in order to gain the advantages of grooving and yet maintain a facing of satisfactory strength.

According to the present invention there is provided a moulded annular clutch facing (as hereinafter defined) having a plurality of surface grooves wherein each groove is moulded into the facing, each groove extends across not substantially more than half the width of the annulus, each groove is not greater in depth than 40% of the thickness of the facing and grooves are arranged extending either from the bore or from the outside perimeter of the annulus.

In this specification by 'moulded facing' we mean a clutch facing which is not wound from impregnated yarn but is moulded from a composition of fibres, polymeric binder and optionally other ingredients such as fillers and friction modifiers. The preferred facings are non-asbestos facings preferably moulded by a slurry process eg as described in our UK Patent No. 1,604,827.

Preferably the grooves have a depth not greater than 35% of the thickness of the moulded facing.

The disposition of the grooves may be radial or may be at an angle to the radial direction, preferably radial.

The width of the grooves should be in the range 1 to 2.5 mm, preferably no more than 1.5 mm, especially in the case where the facing is a thin lightweight facing ie has a thickness of 2-3 mm. In general the width of the grooves should be less than the thickness of the facing.

The number of grooves will generally be in the range 12 to 48, there being preferably an even number of grooves spaced evenly around the facing. Preferably the grooves are arranged extending alternately from the bore and the outside perimeter of the annulus.

The facings grooved in the manner of the present invention provide the benefits of grooves of the conventional kind, extending across the facing but they do not reduce the burst strength of the facing as much as moulded grooves of the normal kind would do, because at all parts of the facings of the present invention half the width of the annulus remains unweakened.

The invention will now be described in more detail, by way of example only, with references to the accompanying drawings in which FIG. 1a shows in plan view a part of a conventional clutch facing with grooves across the full width of the annulus.

FIG. 1b shows in plan view a part of a conventional clutch facing with grooves having closed ends that do not extend across the full width of the annulus; and, FIG. 2 shows the plan view of a clutch facing with the grooves made in accordance with this invention FIG. 3 is a cross-sectional view of a groove having a depth not greater than 40% of the thickness of the facing.

In FIG. 1a an annular clutch facing 1 is illustrated in which grooves 2 are provided across the full width of the annulus. The disposition of the grooves 2 is at an angle to the radial direction and each groove has splayed open ends 3.

In FIG. 1b the annular clutch facing 4, which is illustrated, is similar to that shown in FIG. 1a except that grooves 5 in this facing each have closed ends 6 (ie the grooves 5 do not extend through the edge of the annulus).

In both the facings shown in FIGS. 1a and 1b the angle of the grooves to the radial direction is an acute angle. When the grooves are inclined from the radial direction this is the preferred direction of inclination.

As shown in FIG. 2 an annular clutch facing 7 in accordance with the invention is provided with grooves 8 extended radially outwardly from the bore of the facing alternating around the annulus with grooves 9 extending radially inwardly from the outer circumference of the facing. Each groove has an open end 10 at an edge of the facing and a closed end 11 approximately mid-way across the width of the annulus.

In an embodiment of the facing illustrated in FIG. 2 the facing is a non-asbestos facing made by a slurry-moulding technique the total thickness of the facing being 2 mm. The maximum depth of the moulded grooves is 0.25 mm, each groove extends 1 mm beyond the mid-point of the annulus width and the width of each groove is 1 mm. Preferably the depth of each groove 8 or 9 is not greater than 40%, preferably 35% of the thickness of the facing as shown in FIG. 3.

I claim:

1. A moulded annular clutch facing having a plurality of inwardly extending surface grooves extending from the outside perimeter of the annulus and a plurality of outwardly extending surface grooves extending from the bore of the annulus, the inwardly extending grooves being directed between the outwardly extending grooves, all the grooves being not greater in depth than 40% of the thickness of the facing and all of the grooves each extending across not substantially more than half of the width of the annulus.

2. A clutch facing according to claim 1 in which the grooves have a depth not greater than 35% of the thickness of the facing.

3. A clutch facing according to claim 1 in which the width of the grooves is not greater than the thickness of the facing.

4. A clutch facing according to claim 1 or 2 in which the width of the grooves is in the range 1 to 2.5 mm.

5. A clutch facing according to claim 1 or 2 in which the width of the grooves is not greater than 1.5 mm.

6. A clutch facing according to claim 1 which is a slurry moulded facing of thickness 2 to 3 mm and the grooves have a width in the range 1 to 1.5 mm.

7. A clutch facing according to claim 1 or 6 which has an even number of grooves spaced evenly around the facing.

8. An annular clutch facing according to claim 1 or 6 in which the grooves are arranged extending alternately from the bore and the outside perimeter of the annulus.

9. A clutch facing according to claim 1, in which the inwardly extending grooves are directed midway between the outwardly extending grooves.

* * * * *